US012768472B1

(12) United States Patent
Grimes et al.

(10) Patent No.: US 12,768,472 B1
(45) Date of Patent: Oct. 20, 2026

(54) DOUBLE OFFSET HANGER BRACKET

(71) Applicant: James Stoddard, Carlsbad, CA (US)

(72) Inventors: James E. Grimes, Yorba Linda, CA (US); Rodney Johnson, Las Vegas, NV (US)

(73) Assignee: James Stoddard, Carlsbad, CA (US)

( * ) Notice: Subject to any disclaimer, the term of this patent is extended or adjusted under 35 U.S.C. 154(b) by 0 days.

(21) Appl. No.: 19/530,733

(22) Filed: Feb. 5, 2026

(51) Int. Cl.
*F16L 3/00* (2006.01)

(52) U.S. Cl.
CPC .................................... *F16L 3/00* (2013.01)

(58) Field of Classification Search
CPC ........................................................ F16L 3/00
USPC .. 248/74.1, 56, 57, 58, 65, 66, 72, 200, 300
See application file for complete search history.

(56) References Cited

U.S. PATENT DOCUMENTS 479,331 A * 7/1892 McGregor ............. F16M 13/02 29/897.3
973,830 A * 10/1910 Whitaker .................. F16L 3/00 126/318
2,294,483 A * 9/1942 Smith ....................... F16B 9/01 403/197
2,454,064 A * 11/1948 Johnson .................... F16L 5/00 248/74.4
2,537,703 A * 1/1951 Randa ....................... F16L 3/00 248/75
3,462,108 A * 8/1969 Buyken ................ A47B 96/061 425/111
4,076,281 A * 2/1978 Davis ........................ F16L 3/00 285/337
4,102,587 A * 7/1978 Herb ......................... F16B 7/18 403/231
5,060,891 A * 10/1991 Nagy ...................... F16L 3/127 248/74.1
5,072,903 A * 12/1991 Griffin .................... F16B 2/065 248/74.1
5,236,158 A * 8/1993 Condon .................... F16L 3/24 248/62
5,267,710 A * 12/1993 Condon .................... F16L 3/24 248/65
5,370,345 A * 12/1994 Condon .................... F16L 3/24 248/65
D405,348 S * 2/1999 Orr ................................ D8/354
6,202,969 B1 * 3/2001 Orr ........................... E04B 9/18 248/301
6,463,961 B1 * 10/2002 Iizuka ................ F24F 13/0254 138/155
6,702,236 B1 * 3/2004 Kirschner ................ H02G 7/20 248/65

(Continued)

*Primary Examiner* — Muhammad Ijaz
(74) *Attorney, Agent, or Firm* — Chjarles L. Thoeming

(57) ABSTRACT

A double offset hanger bracket for supporting a pipe relative to a structural framing member is disclosed. The double offset hanger bracket is configured to reference orthogonal surfaces of the framing member and to position the pipe by controlled tangential engagement with external surfaces of the pipe without measurement. Once installed, the double offset bracket enforces predetermined vertical pipe positioning and horizontal pipe positioning independently of the installer's judgment and independently of pipe diameter. The double offset hanger bracket enables repeatable pipe alignment across multiple framing members without cumulative positional drift.

20 Claims, 10 Drawing Sheets

(56) References Cited

U.S. PATENT DOCUMENTS 6,768,057 B2 * 7/2004 Blake .................... H02G 3/18 174/653
7,455,268 B2 * 11/2008 Heath .................. F16L 3/1215 248/65
7,823,361 B2 * 11/2010 Powers, III .............. F16L 3/24 52/691
7,905,454 B2 * 3/2011 Sanatgar .................. F16L 3/12 248/65
8,973,216 B1 * 3/2015 Ramirez .................. H02G 3/22 16/2.2
9,090,025 B2 * 7/2015 Balk .................... B29C 66/131
9,091,056 B2 * 7/2015 Stauffer .................... E04B 1/24
9,200,729 B2 * 12/2015 Hobbs .................. F16L 59/135
9,726,304 B2 * 8/2017 Heath ...................... F16L 3/13
10,006,204 B1 * 6/2018 Robinson ................ F24S 25/61
10,285,514 B2 * 5/2019 Lellimo .................. B65G 1/02
11,668,413 B2 * 6/2023 Geppert .................... F16L 3/00 248/74.1
2002/0114659 A1 * 8/2002 Binna .................... F16L 3/243 403/65
2008/0251652 A1 * 10/2008 Hollender ................ H02G 3/30 248/65
2009/0045301 A1 * 2/2009 Collins .................. F16L 3/245 248/65
2009/0065659 A1 * 3/2009 Dann ...................... F16L 3/127 248/74.1
2015/0021446 A1 * 1/2015 Korcz .................... F16L 3/127 248/58
2015/0069190 A1 * 3/2015 Bartos ...................... F16L 3/04 248/74.1
2015/0337990 A1 * 11/2015 Malaspina ................ F16L 3/26 248/65
2016/0047495 A1 * 2/2016 Satterwhite ............... F16L 5/00 52/27
2023/0248460 A1 * 8/2023 Millward ............... A61B 50/20 248/74.1
2023/0250897 A1 * 8/2023 Addington ................ F16L 3/02 248/74.1

* cited by examiner

3/4"
2.0" H x 3/16" V
102
108
110
112
114
116
118
120

DOUBLE OFFSET HANGER BRACKET

FIELD OF THE INVENTION

The present invention relates to pipe hanger brackets and support devices used in building construction and mechanical systems. More particularly, the invention relates to double offset hanger bracket assemblies and systems configured to reference orthogonal surfaces of a structural framing member and to position pipes by controlled tangential engagement of the orthogonal surfaces with the external surfaces of the pipes.

BACKGROUND OF THE INVENTION

In conventional construction practice, pipes such as fire sprinkler pipes, plumbing pipes, and conduit are commonly routed across multiple framing members, including joists and studs. Existing hanger brackets typically rely on the installer's judgment to determine the final pipe position relative to the framing member. Even where offset brackets are employed, the offset is often defined relative to a fastener hole location, a pipe centerline, or an assumed installation orientation.

U.S. Pat. No. 6,648,278 B1 (the '278 Patent) for an Offset Hanger includes a retainer portion having a wall defining a sector of a cylinder greater than 180 degrees to maintain a pipe or conduit enclosed therein. Two legs extend from the retainer with two mounting flanges extending laterally from the other end of the legs, forming sides triangular in plan. Each leg has a longitudinally extending rib which is channel-shaped in cross section. The deepest part of the channel-shaped rib extends tangentially to the retainer wall and to the mounting flanges. Unitary construction provides significant cantilever strength without requiring component assembly. The '278 Patent neither teaches nor suggests using top-of-joist and side-of-joist faces explicitly as orthogonal structural datums for positioning the Offset Hanger and using those datums to maintain both bottom and side tangents to pipe or conduit in fixed planar relationships to structural framing members.

U.S. Pat. No. 9,726,304 B2 (the '304 Patent) for a Double Offset Pipe Hanger and Restrainer includes a double offset hanger and restrainer device for securely supporting a pipe or the like against undesirable sway and seismic disturbances. The '304 Patent hanger and restrainer device includes a proximal portion mountable to a beam or the like and a specially contoured distal portion with an opening that can receive the pipe in a "snap-on" manner. The snap-on or press-fit feature provides a retrofit installation utility, permitting one or more devices to be added on without disassembly of an existing installation. The '304 Patent neither teaches nor suggests using top-of-joist and side-of-joist faces explicitly as orthogonal structural datums for positioning the Offset Hanger and using those datums to maintain both bottom and side tangents to pipe or conduit in fixed planar relationships to structural framing members.

The Tolco Double Offset Hanger, the nVent Caddy DOSR Double Offset Restraint, and the ASC/Anvil double offset standoff hanger products also rely on double offsets defined relative to a fastener hole location, a pipe centerline, or an assumed installation orientation. Joust-top registration tabs are known; however, using the tab explicitly as a vertical datum tied to pipe tangent geometry is not taught or suggested by these products. A vertical face against a joist needs to be tied in combination to pipe tangent datums. Similarly, offsets are not presented as paired datums tied to joist geometry and pipe tangent planes by these products. Side-mounting is known; however, preserving the identical tangent plane when rotating to a stud is not disclosed or suggested by these products. Multi-size hangers exist, but none are designed to place all pipe diameters on the same bottom and side tangential planes. Standardized double offset hanger bracket patterns exist, but they are not used as part of a coordinate-system-like layout method. And, as with the '278 and 304 Patents, these products neither teach nor suggest using top-of-joist and side-of-joist faces explicitly as orthogonal structural datums for positioning the Offset Hanger or Restraint and using those datums to maintain both bottom and side tangents to pipe or conduit in fixed planar relationships to structural framing members.

Variations in pipe diameter, installation technique, or bracket fastener placement can contribute to cumulative vertical and horizontal pipe misalignment from one framing member to the next. Pipes may drift vertically, laterally, or both, resulting in inconsistent pipe runs, increased installation time, and reduced installation quality. The prior art lacks a double offset hanger bracket that enforces a repeatable, diameter-independent external pipe position by referencing fixed structural datum surfaces and engaging the pipe tangentially rather than axially.

SUMMARY OF THE INVENTION

A double offset hanger bracket for supporting a pipe relative to a structural framing member is disclosed. The double offset hanger bracket is configured to reference orthogonal surfaces of the framing member and to position the pipe by controlled tangential engagement with external surfaces of the pipe. Once installed, the double offset hanger bracket enforces predetermined vertical pipe positioning and horizontal pipe positioning independently of installer's judgment and independently of pipe diameter. The double offset hanger bracket enables repeatable pipe alignment across multiple framing members without cumulative positional drift.

The present invention provides a double offset hanger bracket that establishes pipe position by referencing orthogonal framing surfaces and engaging the pipe at defined tangential contact regions. Once installed on a framing member, the double offset hanger bracket automatically constrains the pipe to a predetermined vertical offset and a predetermined horizontal offset relative to the framing member.

The double offset hanger bracket engages the external surface of the pipe rather than relying on pipe centerlines or an installer-selected change. Pipes of differing diameters are positioned in a common vertical and horizontal relationship. The installer is prevented from inadvertently mispositioning the pipe.

BRIEF DESCRIPTION OF THE DRAWINGS

Having thus summarized the general nature of the double offset hanger bracket and some of its features and advantages, certain preferred embodiments and modifications thereof will become apparent to those skilled in the art from the detailed description herein, referring to these drawing figures.

PVC Schedule 40 pipe and 1" PVC Schedule 40 pipe alignment across multiple framing members without cumulative positional drift.

Figure 1:
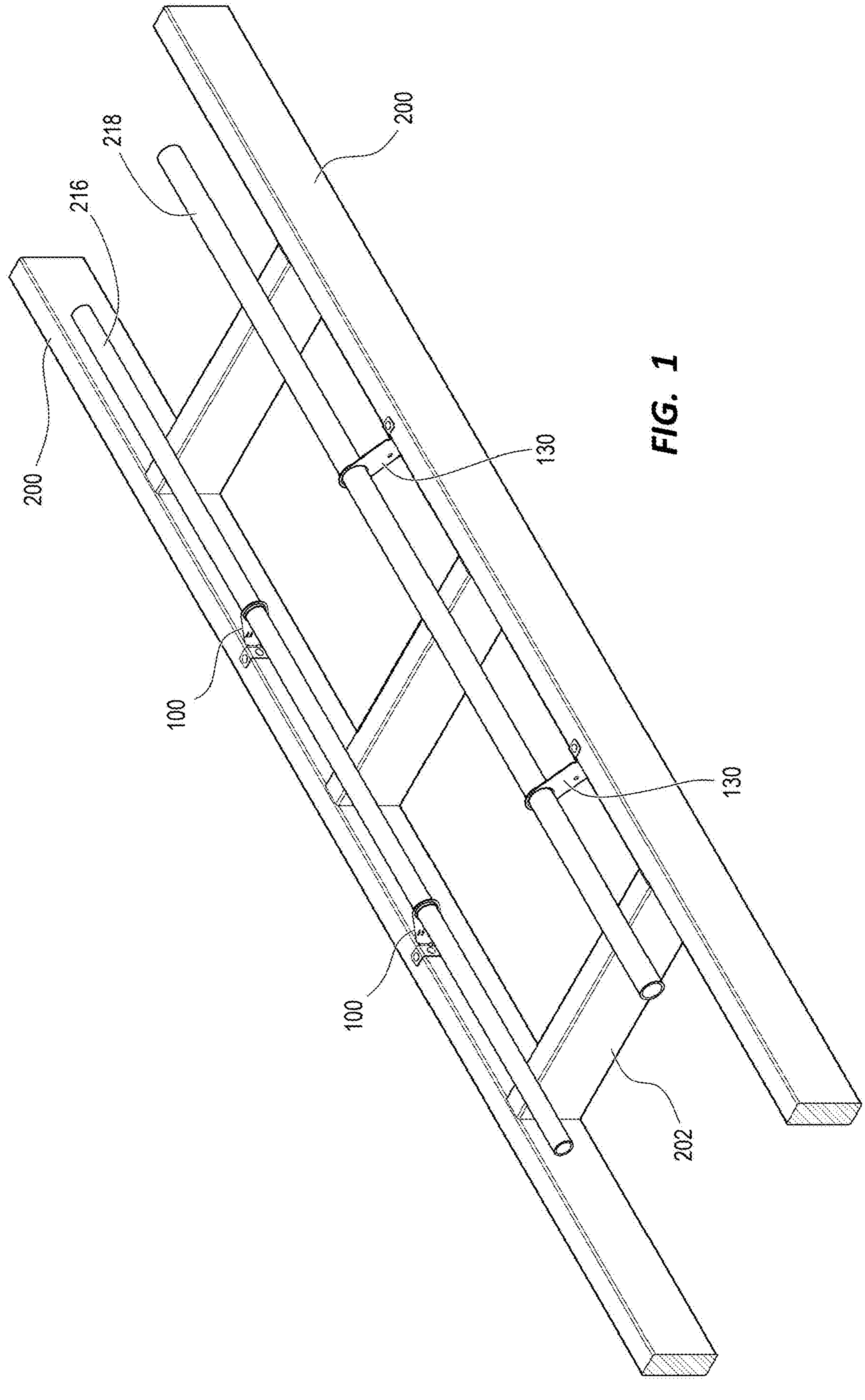
FIG. 1 depicts a left top perspective view of a portion of double offset hanger brackets affixed to representative 2" by 4" ceiling joists and illustrating a section of repeatable ¾"
Figure 2:
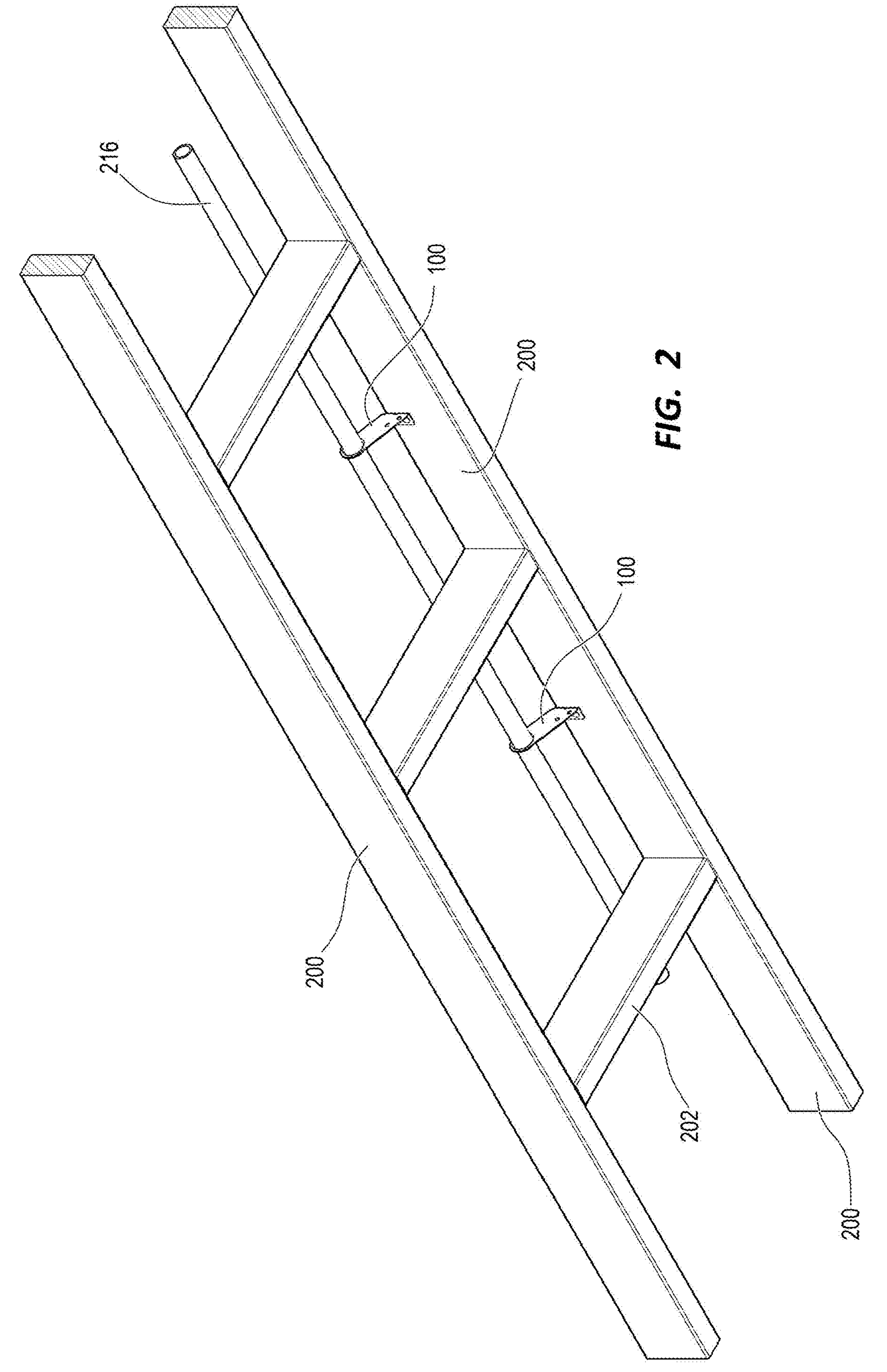

FIG. 2 depicts a bottom right perspective view of FIG. 1.

Figure 3:
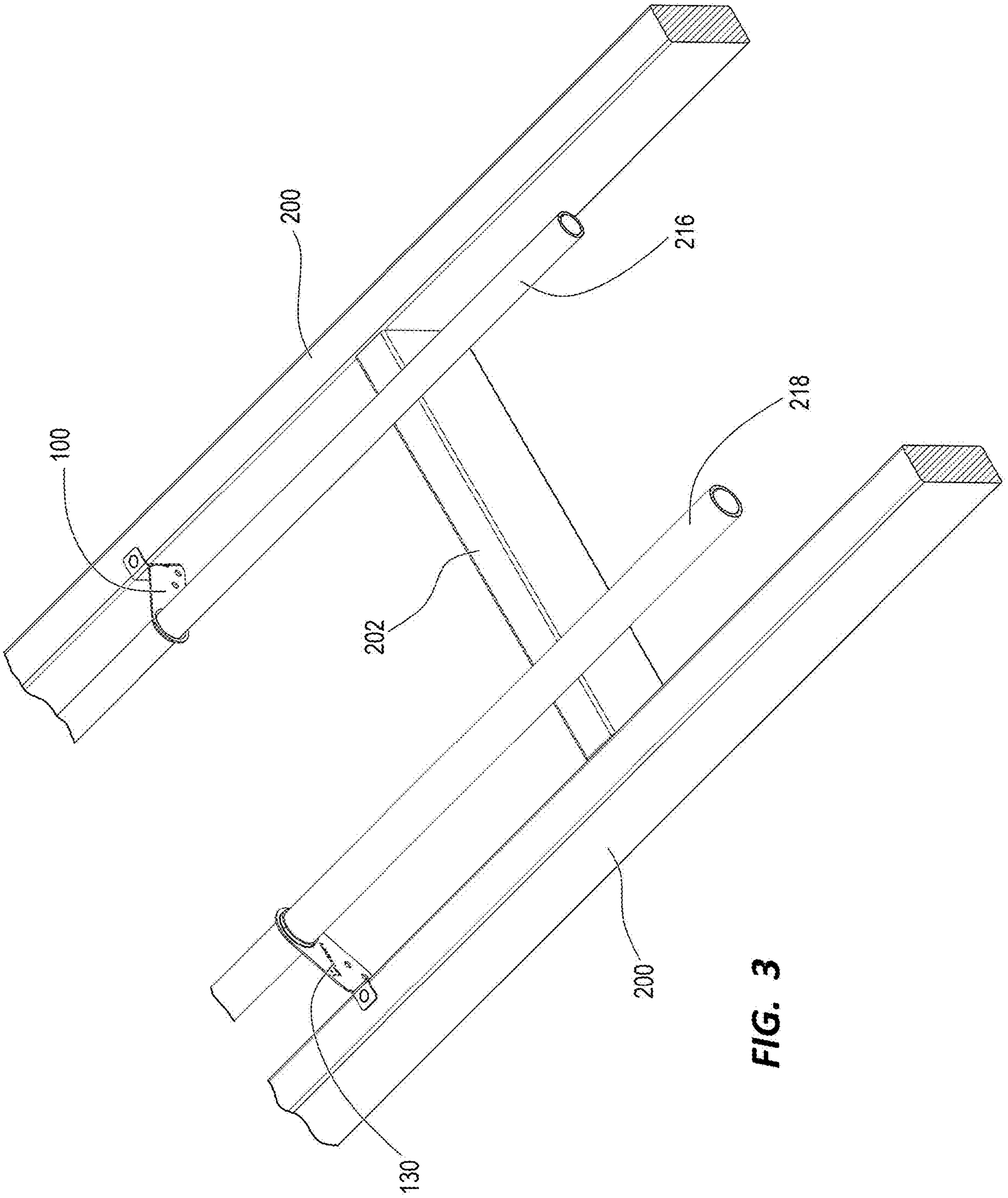

FIG. 3 depicts an enlarged section of FIG. 1.

Figure 4B:
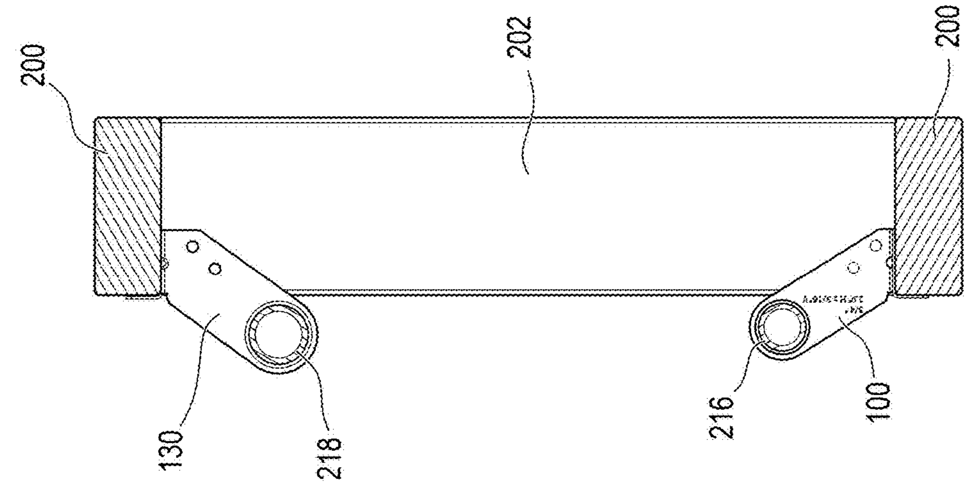
Figure 4A:
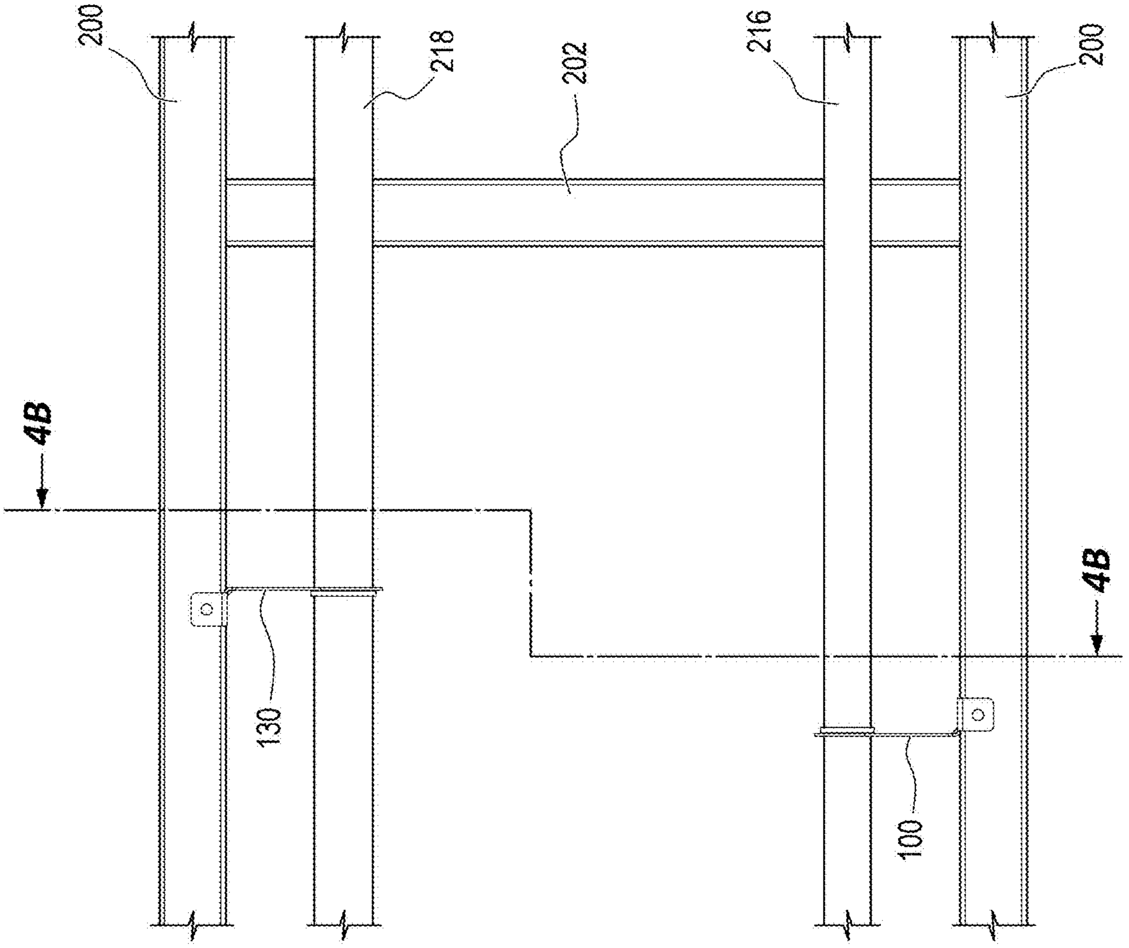

FIG. 4A is a top planar view of FIG. 3.

FIG. 4B is a cross-sectional right side view of FIG. 4A taken at "4B-4B."

Figure 5B:
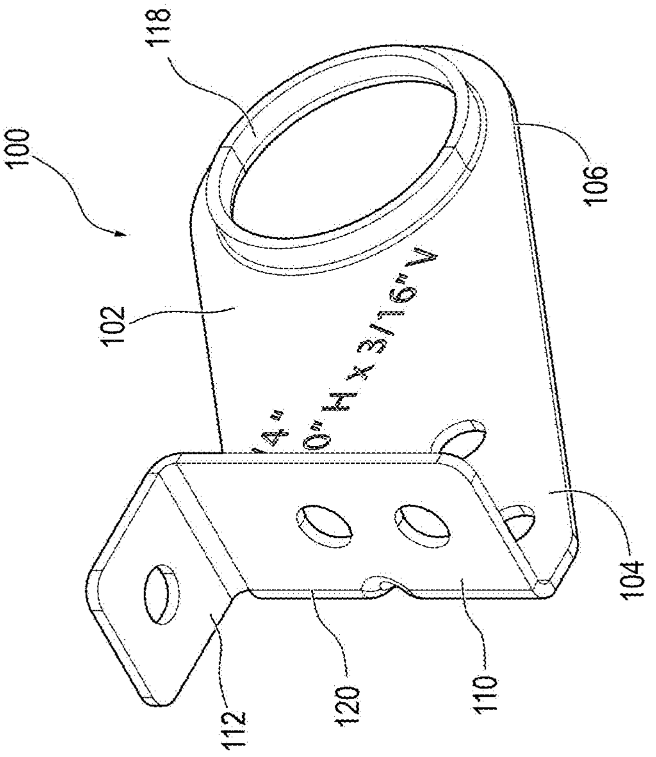
Figure 5A:
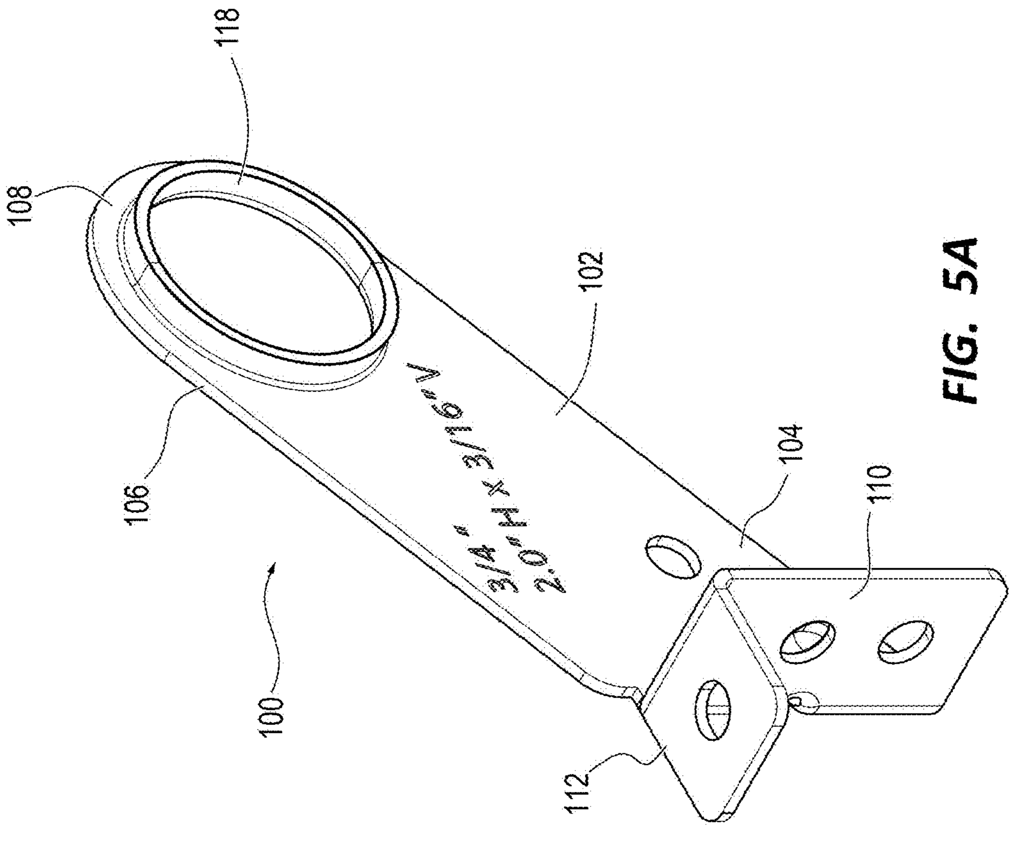

FIG. 5A is a top right perspective view of a double offset hanger bracket sized to align and hold ¾" PVC Schedule 40 pipe.

FIG. 5B is a bottom-right perspective view of FIG. 5A.

Figures 6A, 6B, 6C, 6D, 6E, 6F:
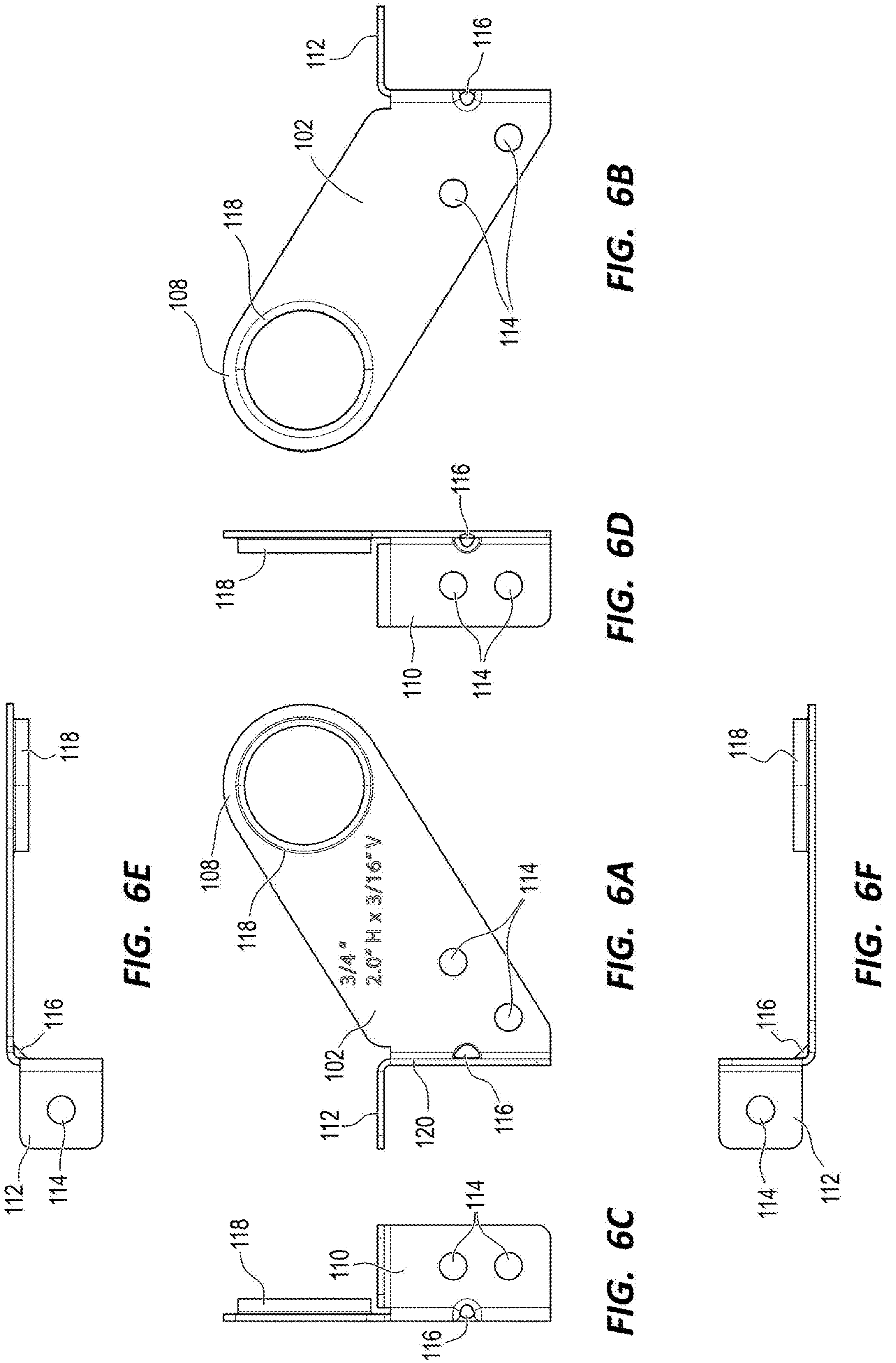

FIG. 6A is a front elevational view of FIG. 5A.

FIG. 6B is a rear elevational view of FIG. 5A.

FIG. 6C is a left side elevational view of FIG. 5A.

FIG. 6D is a right side elevational view of FIG. 5A.

FIG. 6E is a top planar view of FIG. 5A.

FIG. 6F is a bottom planar view of FIG. 5A.

Figure 7B:
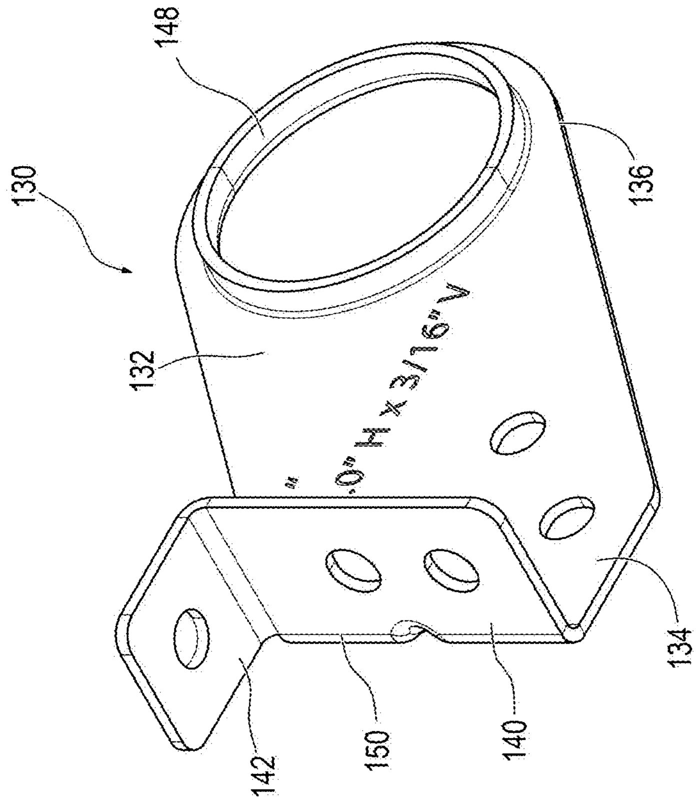
Figure 7A:
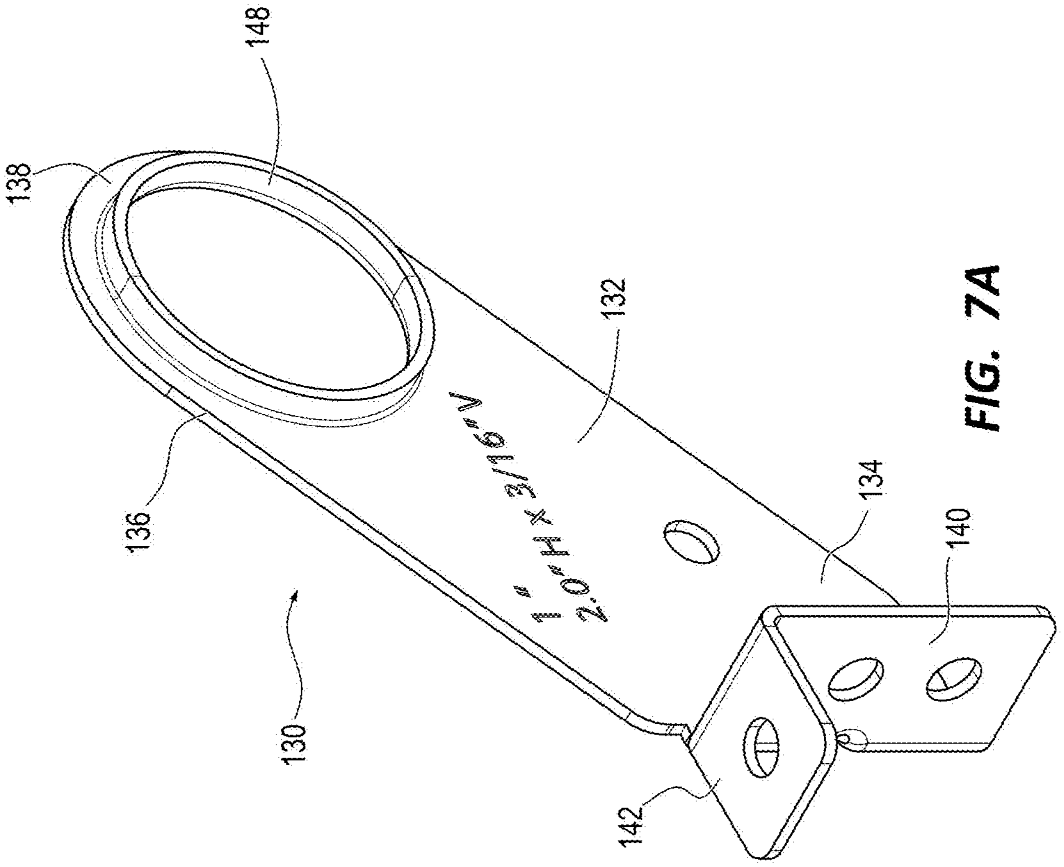

FIG. 7A is a top right perspective view of a double offset hanger bracket sized to align and hold 1" PVC Schedule 40 pipe.

FIG. 7B is a bottom-right perspective view of FIG. 7A.

Figures 8A, 8B, 8C, 8D, 8E, 8F:
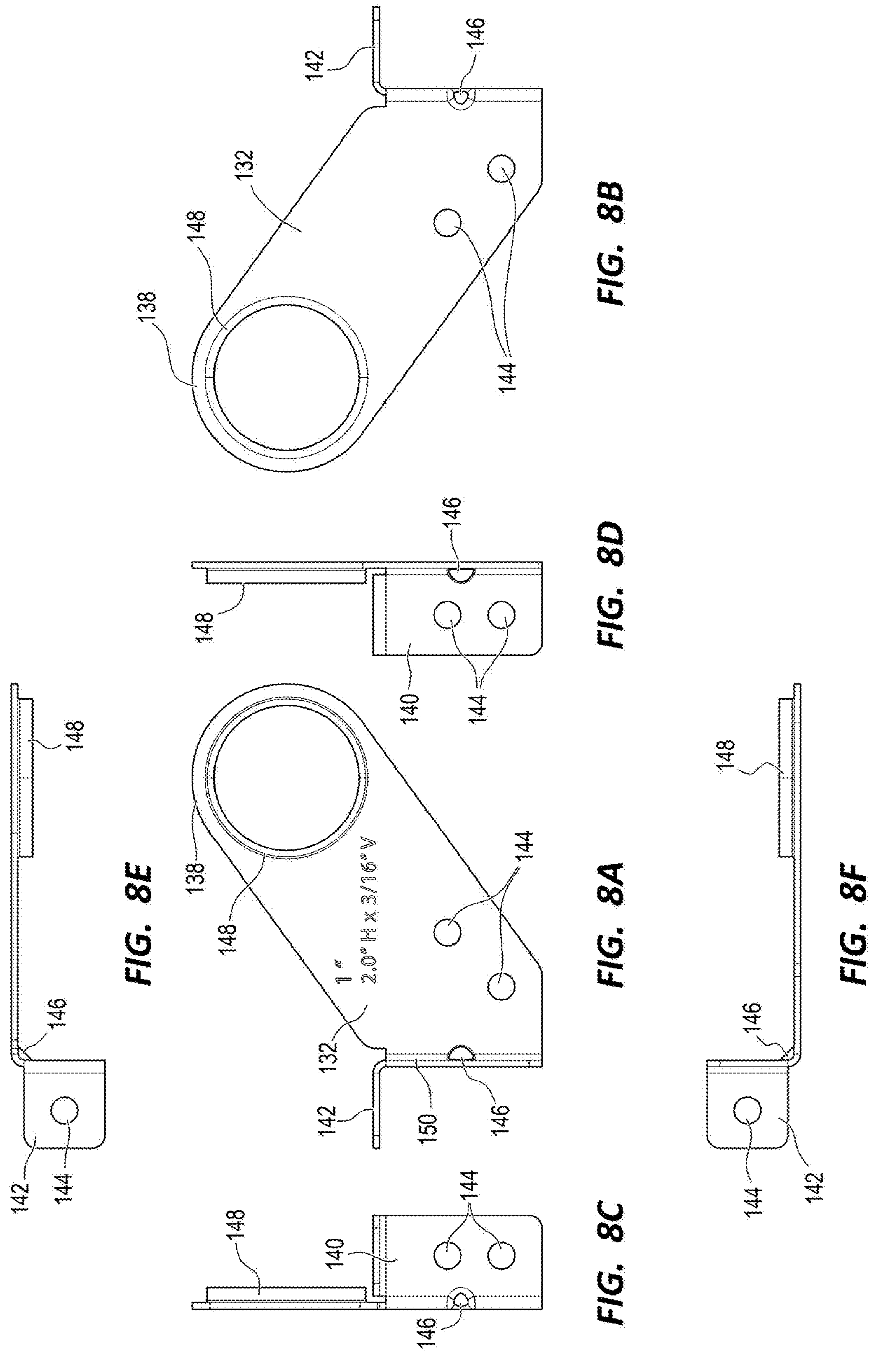

FIG. 8A is a front elevational view of FIG. 7A.

FIG. 8B is a rear elevational view of FIG. 7A.

FIG. 8C is a left side elevational view of FIG. 7A.

FIG. 8D is a right side elevational view of FIG. 7A.

FIG. 8E is a top planar view of FIG. 7A.

FIG. 8F is a bottom planar view of FIG. 7A.

Figure 9B:
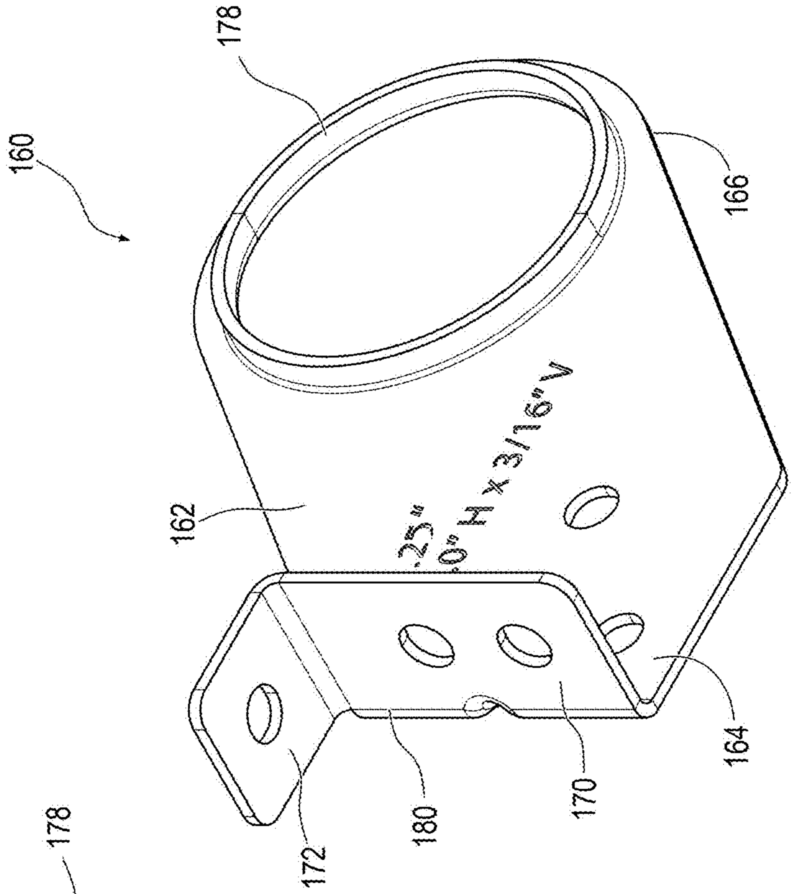
Figure 9A:
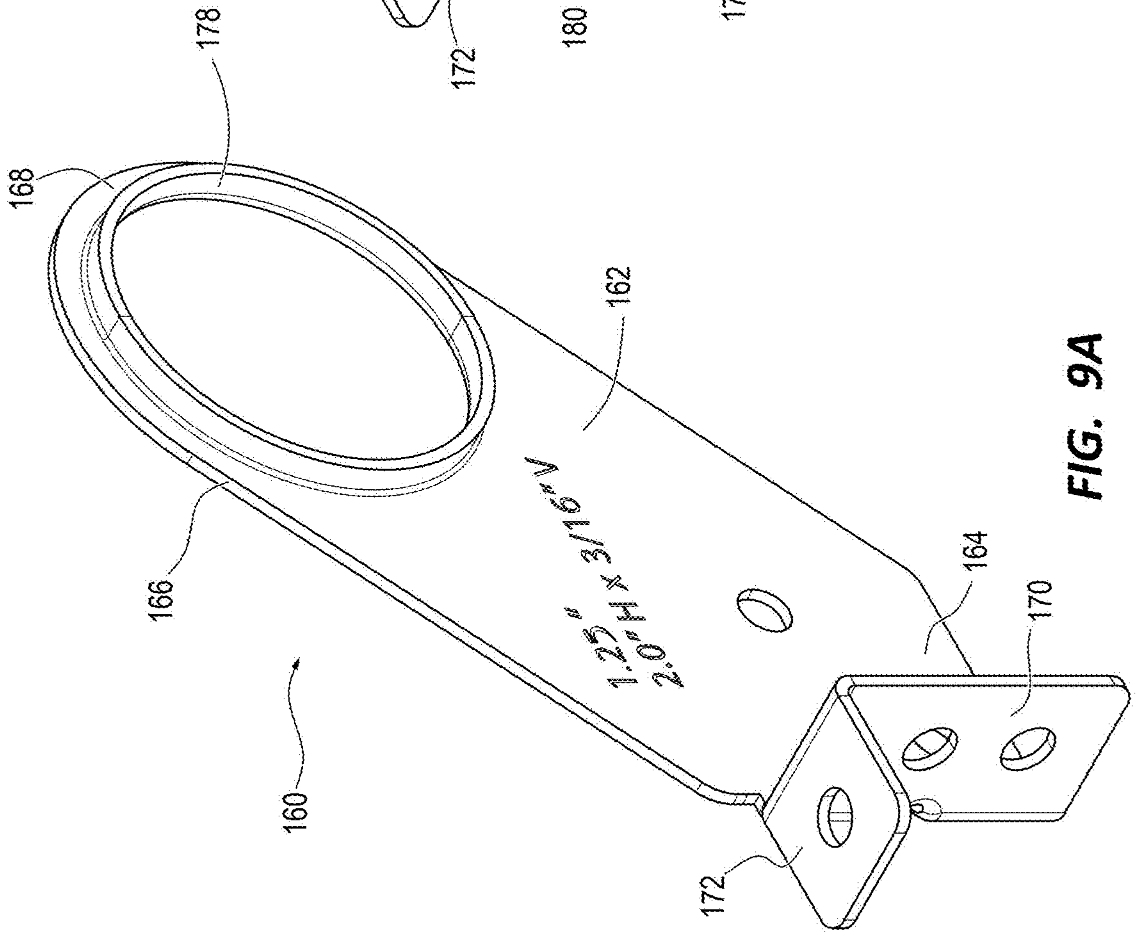

FIG. 9A is a top right perspective view of a double offset hanger bracket sized to align and hold 1¼" PVC Schedule 40 pipe.

FIG. 9B is a bottom-right perspective view of FIG. 9A.

Figures 10A, 10B, 10C, 10D, 10E, 10F:
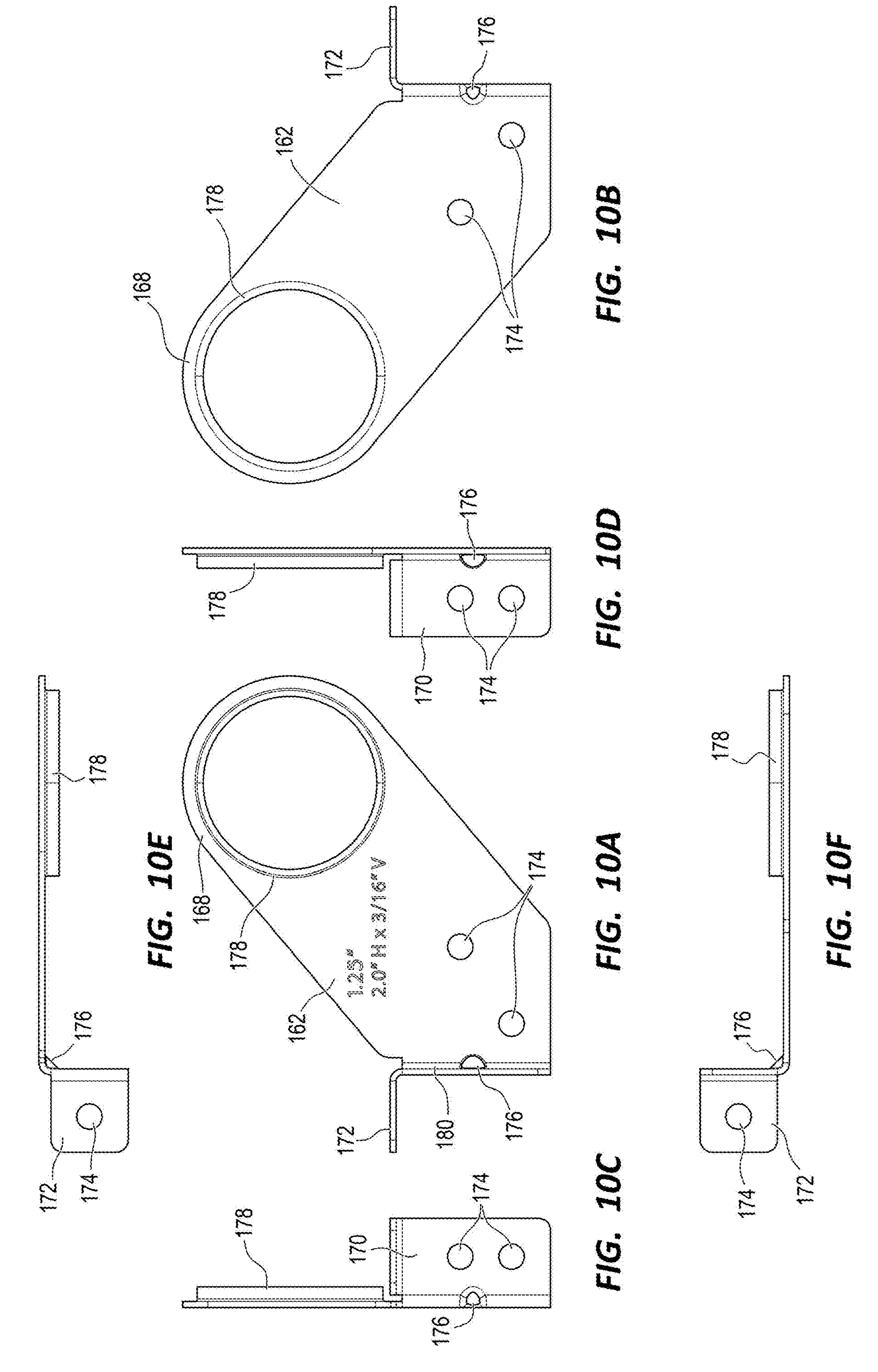

FIG. 10A is a front elevational view of FIG. 9A.

FIG. 10B is a rear elevational view of FIG. 9A.

FIG. 10C is a left side elevational view of FIG. 9A.

FIG. 10D is a right side elevational view of FIG. 9A.

FIG. 10E is a top planar view of FIG. 9A.

FIG. 10F is a bottom planar view of FIG. 9A.

DETAILED DESCRIPTION OF CERTAIN EMBODIMENTS

As used in this disclosure, the terms "datum," "datums," or "datum reference" define a fixed starting point of a scale or operation, or some geometrically important part of an object, such as a point, line, plane, hole, set of holes, or pair of surfaces. These terms serve as a reference in defining the geometry of the object and often in measuring aspects of the actual geometry to assess how closely they match with the nominal value, which may be an ideal, standard, average, desired, or code requirement value.

Embodiments of the double offset hanger bracket are designed for mounting PVC Schedule 40 pipe to a structural framing member such as a residential 2" by 4" ceiling joist (sometimes the "2×4") and support 1¼-inch, 1-inch, and ¾-inch PVC Schedule 40 pipe while maintaining the same tangential offsets of 2 inches (50.8 mm) vertical (datum B) and 3⁄16" (5.5 mm) horizontal (datum A), FIGS. 1-4B. When installed, the bottom tangential alignment of the 1¼-inch, 1-inch, and ¾-inch PVC Schedule 40 pipe is 3⁄16 inch (5.5 mm) above the horizontal datum plane (top surface of the ceiling joist or 2×4), the lateral tangential alignment of the 1¼-inch, 1-inch, and ¾-inch PVC Schedule 40 pipe is 2 inches (50.8 mm) inward from the vertical datum plane (ceiling joist or 2×4 face) providing clearance for running PVC Schedule 40 pipe supported by the embodiment of the double offset hanger bracket across joists and fire blocks. The 3⁄16 inch (5.5 mm) lift offset ensures PVC Schedule 40 pipe clearance above obstructions. The 2 inch (50.8 mm) inward offset keeps all PVC Schedule 40 pipe sizes uniformly aligned along the ceiling joist run, reducing misalignment risk and simplifying installation layout.

Embodiments of the double offset hanger bracket 100, 130, or 160 are affixed to residential ceiling joists using nails or threaded fasteners such as screws through designated mounting holes 114, 144, or 174, respectively, into both the top surface and side faces of the ceiling joist or 2×4 to ensure the double offset hanger brackets sit flush to the horizontal top surface plane (datum A) and flush to the vertical facial plane (datum B) of the ceiling joist or 2×4 for correct offset alignment, FIGS. 1-10F.

Embodiments of the double offset hanger bracket 100, 130, or 160 provide integral vertical tabs, 110, 140, or 170, respectively, and integral horizontal tabs, 112, 142, or 172, respectively, by bends formed with a minimum bend radius per standard sheet metal practices to prevent material cracking or deformation FIGS. 5A-10F. Embodiments of the double offset hanger bracket 100, 130, or 160 are manufactured from zinc plated mild steel with a minimum yield strength of 36,000 PSI.

Finished parts for the embodiments of the double offset hanger bracket 100, 130, or 160 are clean and free of burrs or sharp edges that could damage piping. Vibration deburring is recommended for finishing manufactured embodiments of the double offset hanger bracket 100, 130, or 160.

Embodiments of the double offset hanger bracket, 100, 130, and 160, for positioning a PVC Schedule 40 pipe relative to a structural framing member include a planar bracket body, 102, 132, and 162, respectively, providing a first end, 104, 134, and 164, respectively, and a second end, 106, 136, and 166, respectively, and the double offset hanger bracket, 100, 130, and 160, is configured to engage orthogonal surfaces of the framing member and to support a PVC Schedule 40 pipe FIGS. 5A-10F. This aspect of double offset hanger bracket further provides a PVC Schedule 40 pipe support region, 108, 138, and 168, respectively, configured to tangentially engage an external surface of the PVC Schedule 40 pipe to establish a) a vertical position of the PVC Schedule 40 pipe relative to the framing member 2×4 and b) a horizontal position of the PVC Schedule 40 pipe relative to the framing member 2×4, such that the position of the PVC Schedule 40 pipe is determined by tangential engagement with the PVC Schedule 40 pipe independently of PVC Schedule 40 pipe diameter and independently of installer adjustment, FIGS. 1-4B.

An embodiment of the double offset hanger bracket for positioning a pipe relative to a structural framing member includes an integral vertical tab orthogonally disposed to the planar bracket body and affixed to a first planar bracket body end, and an integral horizontal tab affixed to a top end of the vertical tab and orthogonally disposed to both the planar bracket body and the vertical tab, FIGS. 1-10F.

Embodiments of the double offset hanger bracket 100, 130, and 160 for positioning a PVC Schedule 40 pipe relative to a structural framing member include the planar bracket body 102, 132, and 162, respectively, the integral vertical tab 110, 140, and 170, respectively, and the integral horizontal tab 112, 142, and 172, respectively, all providing mounting holes 114, 144, and 174, respectively, to accommodate fasteners for rigid attachment of the double offset hanger bracket 100, 130, and 160 to the structural framing member 2×4, FIGS. 1-10F.

Embodiments of the double offset hanger bracket 100, 130, and 160 for positioning a PVC Schedule 40 pipe relative to a structural framing member 2×4 include a common seam 120, 150, and 180, respectively, between the planar bracket body 102, 132, and 162, respectively, and the integral vertical tab, 110, 140, and 170, respectively, and include a stiffening rib 116, 146, and 176, respectively, at a mid-point of the common seam 120, 150, and 180, respectively, FIGS. 5A-10F.

An embodiment of the double offset hanger bracket 160 for positioning a 1¼-inch Schedule 40 PVC pipe relative to a structural framing member 2×4 includes the pipe support region 168 providing a flanged circular opening 178 sized to receive a 1¼-inch Schedule 40 PVC pipe through a planar bracket body second end 166, FIGS. 9A-10F.

An embodiment of the double offset hanger bracket 130 for positioning a 1-inch Schedule 40 PVC pipe relative to a structural framing member 2×4 includes the pipe support region 138 providing a flanged circular opening 148 sized to receive a 1-inch Schedule 40 PVC pipe through a planar bracket body second end 136, FIGS. 7A-8F.

An embodiment of the double offset hanger bracket 100 for positioning a ¾-inch Schedule 40 PVC pipe relative to a structural framing member 2×4 includes the PVC Schedule 40 pipe support region 108 providing a flanged circular opening 118 sized to receive a ¾-inch Schedule 40 PVC pipe through a planar bracket body second end 106, FIGS. 5A-6F.

Embodiments of the double offset hanger bracket 100, 130, and 160 for positioning a PVC Schedule 40 pipe relative to a structural framing member 2×4 include a unitary planar bracket body, 102, 132, or 162, respectively, comprising a) a vertical engagement portion, 110, 140, and 170, respectively, configured to seat against a vertical surface of the framing member 2×4, FIGS. 1-10F, b) a horizontal engagement portion, 112, 142, and 172, respectively, configured to seat against a horizontal surface of the framing member 2×4, and c) a PVC Schedule 40 pipe support region, 108, 138, and 168, respectively, offset from the vertical engagement portion, 110, 140, and 170, respectively, and the horizontal engagement portion, 112, 142, and 172, respectively. The PVC Schedule 40 pipe support region, 108, 138, and 168, respectively, provides a lower tangential contact surface configured to establish a predetermined vertical position of the PVC Schedule 40 pipe relative to the framing member 2×4, and a lateral tangential contact surface configured to establish a predetermined horizontal position of the PVC Schedule 40 pipe relative to the framing member 2×4.

A system for positioning at least one PVC Schedule 40 pipe relative to a structural framing member 2×4, embodies the double offset hanger bracket 100, 130, and 160, which include a top-of-joist 2×4 datum tab, 112, 142, and 172, respectively, a side-of-joist datum face, 110, 140, and 170, respectively, a pipe-size-specific support region, 108, 138, and 168, respectively, and a unified double offset hanger bracket family geometry, FIGS. 5A-10F. The system for positioning at least one PVC Schedule 40 pipe relative to a structural framing member 2×4 provides double offset hanger brackets 100, 130, and 160 wherein a) all PVC Schedule 40 pipe diameters reside in the same vertical and horizontal tangent planes across a double offset hanger bracket layout, without measurement; and b) double offset hanger bracket installation is transformed from subjective alignment to a deterministic geometric method FIGS. 1-10F.

We claim:

1. A double offset hanger bracket for positioning a pipe relative to a structural framing member, the double offset hanger bracket comprising:

a planar bracket body having a first end and a second end;

an integral vertical tab orthogonally disposed to the planar bracket body at the first end, the integral vertical tab configured to seat flush against a vertical surface of the structural framing member and defining a first datum plane;

an integral horizontal tab affixed to a top end of the integral vertical tab and orthogonally disposed to both the planar bracket body and the integral vertical tab, the integral horizontal tab configured to seat flush against a horizontal surface of the structural framing member and defining a second datum plane orthogonal to the first datum plane; and a pipe support region at the second end of the planar bracket body, the pipe support region comprising a flanged circular opening configured to tangentially engage an external surface of a pipe so as to establish a predetermined vertical position of the pipe relative to the first datum plane and a predetermined horizontal position of the pipe relative to the second datum plane, independently of pipe diameter and independently of installer adjustment.

2. The double offset hanger bracket of claim 1, wherein the pipe support region further comprises a lower tangential contact surface that establishes the predetermined vertical position of the pipe and a lateral tangential contact surface that establishes the predetermined horizontal position of the pipe.

3. The double offset hanger bracket of claim 1, wherein the predetermined vertical position locates a bottom tangent of the pipe at a fixed vertical offset above the horizontal surface of the structural framing member, and the predetermined horizontal position locates a lateral tangent of the pipe at a fixed horizontal offset inward from the vertical surface of the structural framing member.

4. The double offset hanger bracket of claim 3, wherein the fixed vertical offset is 3⁄16 inches (5.5 mm) above the horizontal surface of the structural framing member, and the fixed horizontal offset is 2 inches (50.8 mm) inward from the vertical surface of the structural framing member.

5. The double offset hanger bracket of claim 1, further comprising mounting holes in the integral vertical tab and the integral horizontal tab, the mounting holes configured to receive fasteners for rigid attachment of the double offset hanger bracket to the structural framing member.

6. The double offset hanger bracket of claim 1, further comprising at least one stiffening rib located at a midpoint of a common seam between the planar bracket body and the integral vertical tab.

7. The double offset hanger bracket of claim 1, wherein the flanged circular opening is sized to receive a ¾-inch Schedule 40 PVC pipe.

8. The double offset hanger bracket of claim 1, wherein the flanged circular opening is sized to receive a 1-inch Schedule 40 PVC pipe.

9. The double offset hanger bracket of claim 1, wherein the flanged circular opening is sized to receive a 1¼-inch Schedule 40 PVC pipe.

10. The double offset hanger bracket of claim 1, wherein the planar bracket body, the integral vertical tab, and the integral horizontal tab are formed as a unitary structure from zinc-plated mild steel having a minimum yield strength of 36,000 PSI.

11. The double offset hanger bracket of claim 1, wherein the integral vertical tab and the integral horizontal tab are formed by bends having a minimum bend radius conforming to standard sheet metal practices.

12. The double offset hanger bracket of claim 1, wherein the structural framing member is a 2-inch by 4-inch ceiling joist.

13. A double offset hanger bracket for positioning a pipe relative to a structural framing member having a horizontal top surface and a vertical side surface, the double offset hanger bracket comprising:

a unitary planar bracket body comprising:

a vertical engagement portion orthogonally disposed to the planar bracket body and configured to seat against the vertical side surface of the structural framing member;

a horizontal engagement portion configured to seat against the horizontal top surface of the structural framing member, the horizontal engagement portion being orthogonally disposed to both the vertical engagement portion and the planar bracket body; and a pipe support region offset from both the vertical engagement portion and the horizontal engagement portion, the pipe support region providing a lower tangential contact surface configured to establish a predetermined vertical position of the pipe relative to the horizontal top surface and a lateral tangential contact surface configured to establish a predetermined horizontal position of the pipe relative to the vertical side surface, such that a bottom tangent plane and a lateral tangent plane of the pipe are each determined by geometry of the pipe support region without measurement or installer adjustment.

14. The double offset hanger bracket of claim 13, wherein the pipe support region comprises a flanged circular opening dimensioned for a specific pipe diameter, and wherein the predetermined vertical position and predetermined horizontal position are maintained for any pipe diameter for which a correspondingly sized double offset hanger bracket is selected.

15. The double offset hanger bracket of claim 13, wherein the vertical engagement portion and the horizontal engagement portion each comprise mounting holes configured to receive fasteners for attachment to the structural framing member.

16. The double offset hanger bracket of claim 13, further comprising at least one stiffening rib at a midpoint of a common seam between the bracket body and the vertical engagement portion.

17. A system for positioning at least one pipe relative to a plurality of structural framing members, the system comprising:

a plurality of double offset hanger brackets, each double offset hanger bracket comprising:

a planar bracket body having a pipe support region comprising a flanged circular opening configured to tangentially engage an external surface of a pipe;

an integral vertical tab orthogonally disposed to the planar bracket body and configured to seat against a vertical side surface of a respective structural framing member, the integral vertical tab defining a side-of-framing datum plane; and an integral horizontal tab orthogonally disposed to both the planar bracket body and the integral vertical tab, configured to seat against a horizontal top surface of the respective structural framing member, the integral horizontal tab defining a top-of-framing datum plane;

wherein the flanged circular opening of each double offset hanger bracket is positioned relative to the side-of-framing datum plane and the top-of-framing datum plane such that, upon installation across the plurality of structural framing members, all pipes supported by the plurality of double offset hanger brackets reside in a common vertical tangent plane and a common horizontal tangent plane across the entire bracket layout without measurement.

18. The system of claim 17, wherein the plurality of double offset hanger brackets comprises a first bracket having a flanged circular opening sized for a first pipe diameter and a second bracket having a flanged circular opening sized for a second pipe diameter different from the first pipe diameter, and wherein the common vertical tangent plane and the common horizontal tangent plane are the same for both the first bracket and the second bracket.

19. The system of claim 17, wherein the predetermined vertical offset from the top-of-framing datum plane to the bottom tangent of the pipe is 3/16 inches (5.5 mm) and the predetermined horizontal offset from the side-of-framing datum plane to the lateral tangent of the pipe is 2 inches (50.8 mm), for each double offset hanger bracket in the plurality.

20. The system of claim 17, wherein each double offset hanger bracket is a unitary structure formed from zinc-plated mild steel, and wherein each double offset hanger bracket comprises mounting holes in the integral vertical tab and the integral horizontal tab for rigid fastened attachment to the respective structural framing member.

* * * * *